(12) United States Patent
Sekiguchi et al.

(10) Patent No.: US 10,953,910 B2
(45) Date of Patent: Mar. 23, 2021

(54) STEERING DEVICE

(71) Applicant: YAMADA MANUFACTURING CO., LTD., Kiryu (JP)

(72) Inventors: Toru Sekiguchi, Kiryu (JP); Taisuke Honma, Kiryu (JP)

(73) Assignee: YAMADA MANUFACTURING CO., LTD., Kiryu (JP)

( * ) Notice: Subject to any disclaimer, the term of this patent is extended or adjusted under 35 U.S.C. 154(b) by 53 days.

(21) Appl. No.: 16/520,801

(22) Filed: Jul. 24, 2019

(65) Prior Publication Data
US 2020/0039567 A1 Feb. 6, 2020

(30) Foreign Application Priority Data

Jul. 31, 2018 (JP) .............................. JP2018-143339

(51) Int. Cl.
B62D 1/19 (2006.01)
B62D 1/181 (2006.01)
B62D 1/185 (2006.01)
B62D 1/187 (2006.01)

(52) U.S. Cl.
CPC ............. B62D 1/192 (2013.01); B62D 1/181 (2013.01); B62D 1/185 (2013.01); B62D 1/187 (2013.01)

(58) Field of Classification Search
None
See application file for complete search history.

(56) References Cited

U.S. PATENT DOCUMENTS

| 10,604,172 | B2* | 3/2020 | Yoon | B62D 1/187 |
| 10,800,442 | B2* | 10/2020 | Ishimura | B62D 1/192 |
| 2007/0194563 | A1* | 8/2007 | Menjak | B62D 1/195 |
| | | | | 280/777 |
| 2015/0232117 | A1* | 8/2015 | Stinebring | B62D 1/195 |
| | | | | 74/493 |
| 2019/0100230 | A1* | 4/2019 | Messing | B62D 1/195 |
| 2019/0126968 | A1* | 5/2019 | Messing | B62D 1/181 |
| 2019/0152511 | A1* | 5/2019 | Shiroishi | B62D 1/192 |
| 2019/0322307 | A1* | 10/2019 | Kwon | B62D 1/195 |
| 2020/0207402 | A1* | 7/2020 | Fricke | B62D 1/195 |

FOREIGN PATENT DOCUMENTS

| EP | 3124355 A2 * | 2/2017 | ............. B62D 1/192 |
| JP | 2016-049923 | 4/2016 | |

* cited by examiner

Primary Examiner — Drew J Brown
(74) Attorney, Agent, or Firm — Rankin, Hill & Clark LLP

(57) ABSTRACT

According to an aspect, there is provided a steering device including a pipe, a housing, a telescopic mechanism, and a load absorbing mechanism. The load absorbing mechanism includes a first connection member connecting a hanger bracket and an EA plate to each other and a second connection member connecting a guide plate and the EA plate to each other. In a case where a forward acting load applied to the pipe has a predetermined value or greater, the load absorbing mechanism is configured so that the first connection member is slidable on the EA plate, and is configured so that the second connection member is slidable on the EA plate.

4 Claims, 7 Drawing Sheets

STEERING DEVICE

CROSS-REFERENCE TO RELATED APPLICATION

Priority is claimed on Japanese Patent Application No. 2018-143339, filed on Jul. 31, 2018, the content of which is incorporated herein by reference.

BACKGROUND OF THE INVENTION

Field of the Invention

The present invention relates to a steering device.

Description of Related Art

A certain steering device is provided with a telescopic function. The telescopic function is to adjust front and rear positions of a steering wheel in accordance with a body difference or driving posture of a driver. As this type steering device, a configuration is known which includes a main tube, an outer tube, and an inner tube (for example, refer to Japanese Unexamined Patent Application, First Publication No. 2016-49923 (hereafter, referred to as Patent Document 1)). The main tube is supported by a vehicle body. The outer tube is held inside the main tube so as to be movable in a forward-rearward direction. The inner tube is held inside the outer tube, and rotatably supports the steering shaft.

According to the invention disclosed in Patent Document 1 described above, the inner tube has a slit extending in the forward-rearward direction. The outer tube is joined to the inner tube by a bolt inserted into the slit of the inner tube.

In the steering device according to the invention disclosed in Patent Document 1, during a telescopic operation, the outer tube, the inner tube, and a steering shaft integrally move forward to and rearward from the main tube.

In a case where a predetermined load is applied to a steering wheel at the time of secondary collision, the inner tube attempts to move forward to the outer tube. In this case, the inner tube moves forward while the bolt widens the slit, thereby relieving an impact load applied to the driver at the time of secondary collision.

According to the above-described related art, in order to secure a stroke of the inner tube at the time of secondary collision, it is necessary to increase a length of the slit. However, if the length of the slit is increased so as to secure a movement space of the bolt, there is a possibility that layout quality around the inner tube may be degraded. In addition, there is a possibility that the steering device may increase in size.

Therefore, according to an aspect of the present invention, there is provided a steering device which can secure a stroke of a pipe at the time of secondary collision while preventing degraded layout quality.

SUMMARY OF THE INVENTION

In order to solve the above-described problems, the present invention adopts the following aspects.

(1) According to an aspect of the present invention, there is provided a steering device including a pipe into which a steering shaft is inserted so as to be rotatable around a first axis line extending along a forward-rearward direction, a housing that is supported by a vehicle body, and that supports the pipe so as to be movable in the forward-rearward direction, a telescopic mechanism that moves the pipe with respect to the housing in the forward-rearward direction, and a load absorbing mechanism that is disposed between the pipe and the telescopic mechanism. The load absorbing mechanism includes a first support portion disposed in the pipe, a second support portion disposed in the telescopic mechanism, an intermediate support portion located between the first support portion and the second support portion, a first connection member fixed to the first support portion, and connecting the first support portion and the intermediate support portion to each other, and a second connection member fixed to the second support portion, and connecting the second support portion and the intermediate support portion to each other. In a case where a forward acting load applied to the pipe has a predetermined value or greater, the load absorbing mechanism is configured so that the first connection member and the intermediate support portion are relatively slidable, and is configured so that the second connection member and the intermediate support portion are relatively slidable.

In the steering device according to this aspect, at the time of second collision, a collision load can be relieved by a load applied between the first connection member and the intermediate support portion and a load applied between the intermediate support portion and the second connection member. That is, the intermediate support portion relatively slides on both the first connection member and the second connection member. Therefore, compared to a configuration in which an impact load is relieved only by the sliding between the intermediate support portion and the pipe, a length of the intermediate support portion in the forward-rearward direction can be shortened as much as a sliding length between the intermediate support portion and the second connection member. In this manner, front and rear spaces for the intermediate support portion are likely to be secured while securing the stroke at the time of secondary collision. Therefore, layout quality around the pipe can be improved.

(2) In the steering device according to the above-described aspect (1), the intermediate support portion may overlap a portion between the first support portion and the second support portion, when viewed in an intersection direction intersecting the forward-rearward direction. The intermediate support portion may have a first long hole penetrating the intermediate support portion in the intersection direction, and extending in the forward-rearward direction, and a second long hole penetrating the intermediate support portion in the intersection direction, and extending in the forward-rearward direction. The first connection member may be inserted into a rear end portion of the first long hole. The second connection member may be inserted into a front end portion of the second long hole.

According to this aspect, the intermediate support portion and the first support portion can be reliably connected to each other, and the intermediate support portion and the second support portion can be reliably connected to each other by the connection member. In this manner, when in normal use (for example, during a telescopic operation), the pipe and the telescopic mechanism can be reliably connected to each other via the load absorbing mechanism. At the time of secondary collision, the intermediate support portion can be stably slid on the connection member.

(3) In the steering device according to the above-described aspect (2), the first long hole may have a first large diameter portion which is located in a rear end portion of the first long hole, and into which the first connection member is inserted, and a first small diameter portion which extends forward of the first large diameter portion, and which is widened by the first connection member when the first connection member and the intermediate support portion relatively move in the forward-rearward direction. The second long hole may have a second large diameter portion which is located in a front end portion of the second long hole, and into which the second connection member is inserted, and a second small diameter portion which extends rearward of the second large diameter portion, and which is widened by the second connection member when the second connection member and the intermediate support portion relatively move in the forward-rearward direction.

According to this aspect, at the time of secondary collision, it is possible to secure sliding resistance applied between the intermediate support portion and the first connection member, and sliding resistance applied between the intermediate support portion and the second connection member. In this manner, collision absorbing performance can be improved.

Moreover, compared to a case where the impact load is relieved by a first stage stroke as in the related art, it is possible to prevent the movement of the connection member from being hindered by burrs generated when the slit is widened. Therefore, it is possible to prevent an excessive increase in the sliding resistance between the first connection member and the intermediate support portion and the sliding resistance between the second connection member and the intermediate support portion.

(4) In the steering device according to any one of the above-described aspects (1) to (3), the telescopic mechanism may include a motor unit disposed in the housing, a shaft having a male screw joined to an output shaft of the motor unit, and a nut disposed in the pipe, and screwed to the shaft.

According to this configuration, at the time of secondary collision, the male screw of the shaft and the female screw of the movable portion come into contact with each other. Accordingly, the forward movement of the movable portion with respect to the housing is regulated. In this manner, it is possible to regulate the guide plate in moving forward to the movable portion, and the relative movement between an EA plate and the connection member can be promoted. In this case, it is not necessary to separately provide a fixing portion of the guide plate. Therefore, it is possible to prevent an increase in the number of components and a complicated configuration.

According to the above-described respective aspects, the stroke of the pipe can be secured at the time of secondary collision while preventing the degraded rigidity or the degraded layout quality of the pipe.

DETAILED DESCRIPTION OF THE INVENTION

Figure 1:
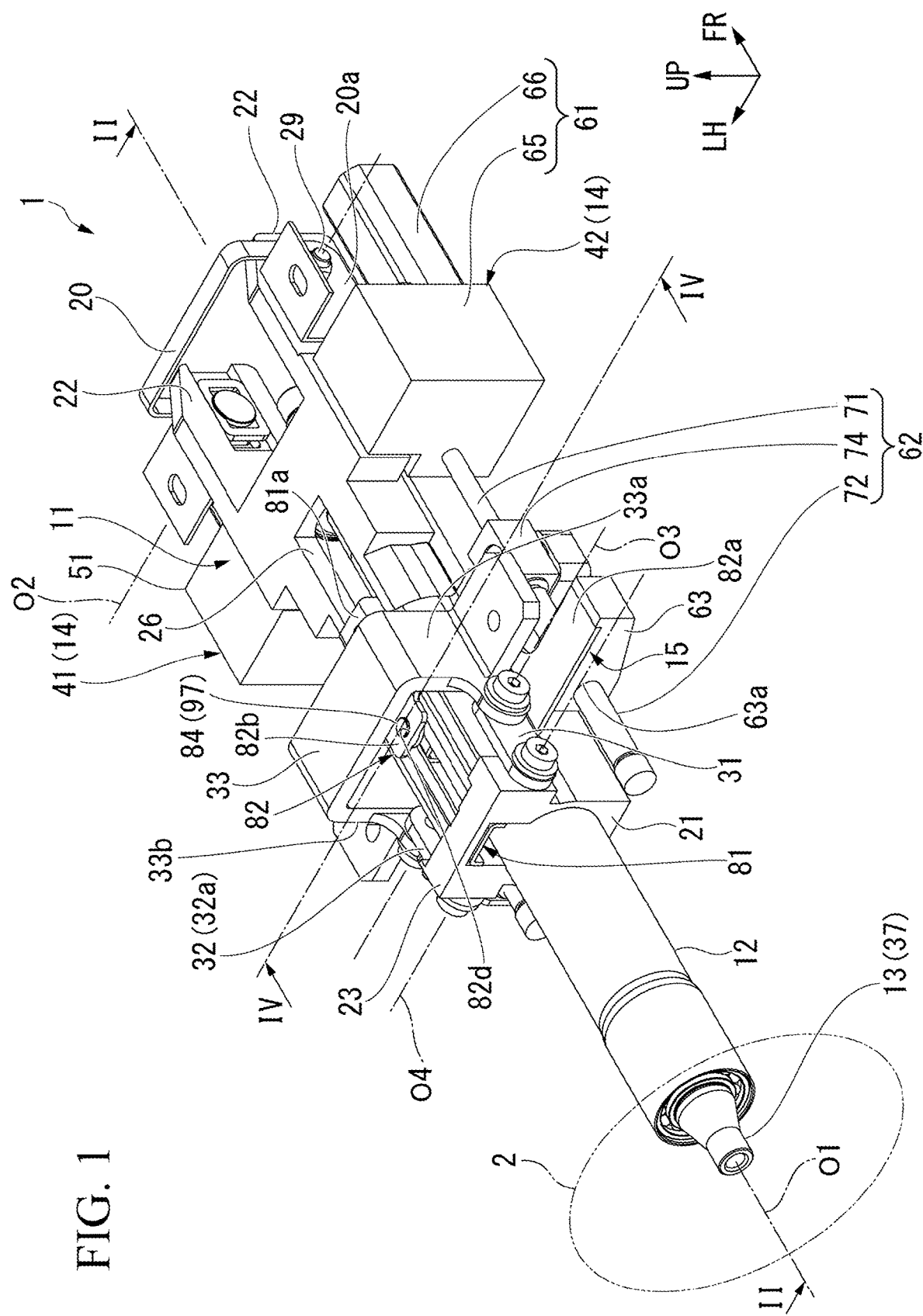
FIG. 1 is a perspective view of a steering device.

Hereinafter, an embodiment according to the present invention will be described with reference to the drawings.
Steering Device
FIG. 1 is a perspective view of a steering device 1.
As shown in FIG. 1, the steering device 1 is mounted on a vehicle. The steering device 1 adjusts a steering angle of wheels in accordance with a rotating operation of a steering wheel 2.

The steering device 1 includes a housing 11, a pipe 12, a steering shaft 13, a drive mechanism 14, and a load absorbing mechanism 15. The pipe 12 and the steering shaft 13 are respectively formed along an axis line O1. Therefore, in the following description, an extending direction of the axis line O1 of the pipe 12 and the steering shaft 13 will be simply referred to as a shaft axis direction, a direction perpendicular to the axis line O1 will be simply referred to as a shaft radial direction, and a direction around the axis line O1 will be simply referred to as a shaft circumferential direction, in some cases.

The steering device 1 according to the present embodiment is mounted on the vehicle in a state where the axis line O1 intersects a forward-rearward direction. Specifically, the axis line O1 of the steering device 1 extends upward as the steering device 1 is directed rearward. However, in the following description, for the sake of convenience, in the steering device 1, a direction toward the steering wheel 2 in the shaft axis direction will be simply referred to as rearward, and a direction toward a side opposite to the steering wheel 2 will be simply referred to as forward (arrow FR). In the shaft radial direction, an upward-downward direction in a state where the steering device 1 is attached to the vehicle will be simply referred to as an upward-downward direction (arrow UP represents upward), and a rightward-leftward direction in the same state will be simply referred to as a rightward-leftward direction (arrow LH represents a left side).

Housing

The housing 11 is attached to a vehicle body via brackets (front side bracket 20 and rear side bracket 33). The housing 11 has a holding cylinder 21, a front side mounting stay 22, and a rear side mounting stay 23.

Figure 2:
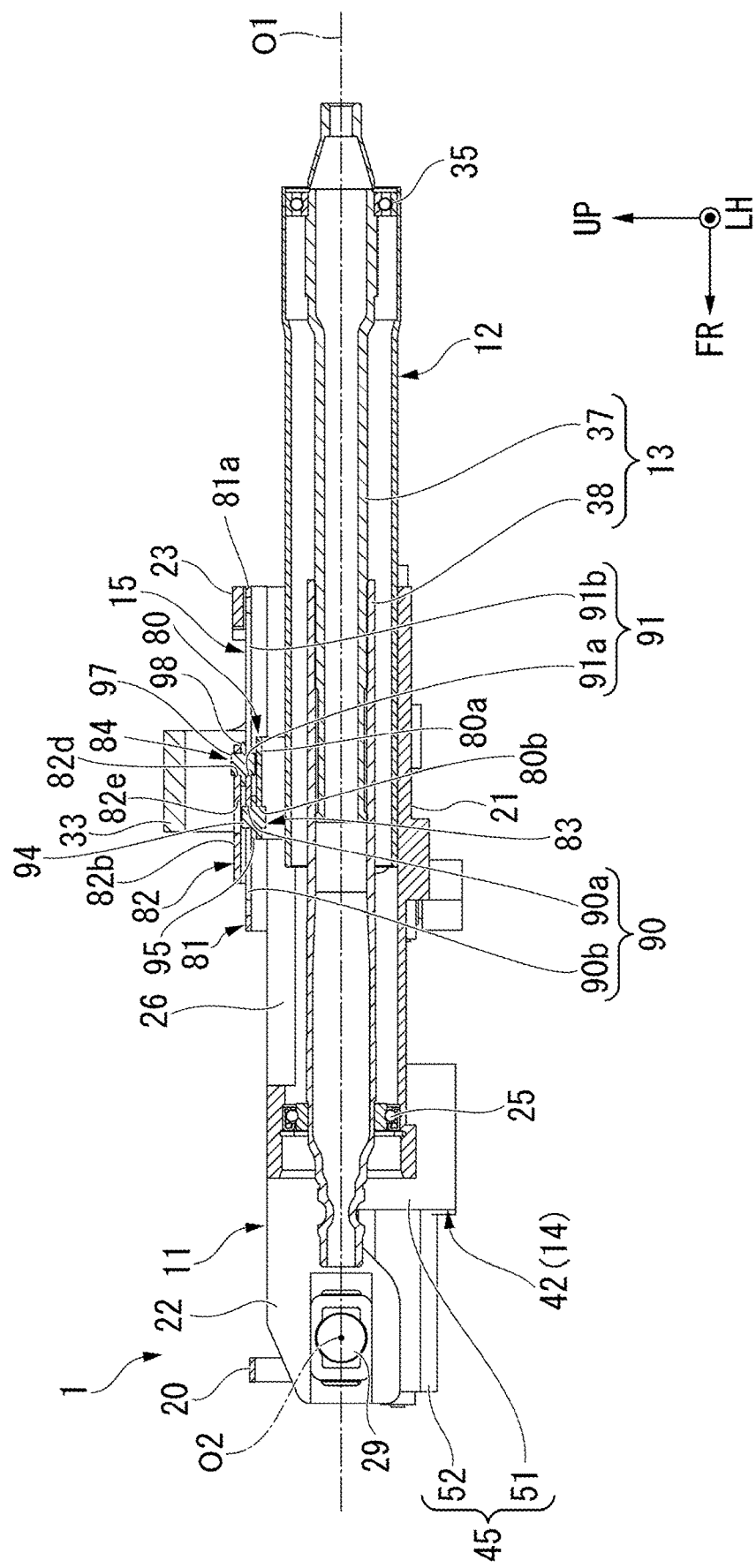
FIG. 2 is a sectional view taken along line II-II in FIG. 1.

FIG. 2 is a sectional view taken along line II-II in FIG. 1.
As shown in FIGS. 1 and 2, the holding cylinder 21 is formed in a cylindrical shape extending in the shaft axis direction (forward-rearward direction). As shown in FIG. 2, an outer ring of a front side bearing 25 is fitted (press-fitted) to a front end portion inside the holding cylinder 21. In a rear portion of the holding cylinder 21, a slit 26 is formed in a portion (in the present embodiment, an upper portion of the holding cylinder 21) in the shaft circumferential direction. The slit 26 penetrates the holding cylinder 21 in the shaft radial direction.

As shown in FIGS. 1 and 2, the front side mounting stays 22 respectively extend forward from the portions located on both sides in the rightward-leftward direction in the front end portion of the holding cylinder 21. The above-described front side bracket 20 is attached to the front end portion of the front side mounting stay 22.

The front side bracket 20 connects the front side mounting stay 22 and the vehicle body to each other. Specifically, the front side bracket 20 is formed in a U-shape which is open downward in a front view when viewed in the shaft axis direction. The front side bracket 20 surrounds the front end portion of the housing 11 from above and from both sides in the rightward-leftward direction. In the front side bracket 20, front side walls 20*a* and 20*a* located on both sides in the rightward-leftward direction are connected to the front side mounting stay 22 by pivot shafts 29 and 29 extending in the rightward-leftward direction. In this manner, the housing 11 is supported by the front side bracket 20 so as to be pivotable around a pivot shaft 29 (around the axis line O2 extending in the rightward-leftward direction).

The rear side mounting stay 23 is formed in a rear end portion of the holding cylinder 21. Specifically, the rear side mounting stay 23 is located across the slit 26 in the rightward-leftward direction in the upper portion of the holding cylinder 21. The above-described rear side bracket 33 is attached to the rear side mounting stay 23 via link plates (first link plate 31 and second link plate 32).

The rear side bracket 33 is formed in a hat shape which is open downward in a front view. The rear side bracket 33 surrounds the holding cylinder 21 from above and from both sides in the rightward-leftward direction. That is, the rear side bracket 33 has a right side wall 33*a* located on a first side (right side) in the rightward-leftward direction with respect to the holding cylinder 21 and a left side wall 33*b* located on a second side (left side) in the rightward-leftward direction with respect to the holding cylinder 21.

The above-described first link plate 31 connects the rear side mounting stay 23 and the rear side bracket 33 to each other on the right side with respect to the housing 11. The first link plate 31 is formed in a plate shape extending along the shaft axis direction in a side view when viewed in the rightward-leftward direction. The front end portion of the first link plate 31 is supported by the above-described right side wall 33*a* so as to be pivotable around an axis line O3 extending in the rightward-leftward direction. The rear end portion of the first link plate 31 is supported by the rear side mounting stay 23 so as to be pivotable around an axis line O4 extending in the rightward-leftward direction.

Figure 3:
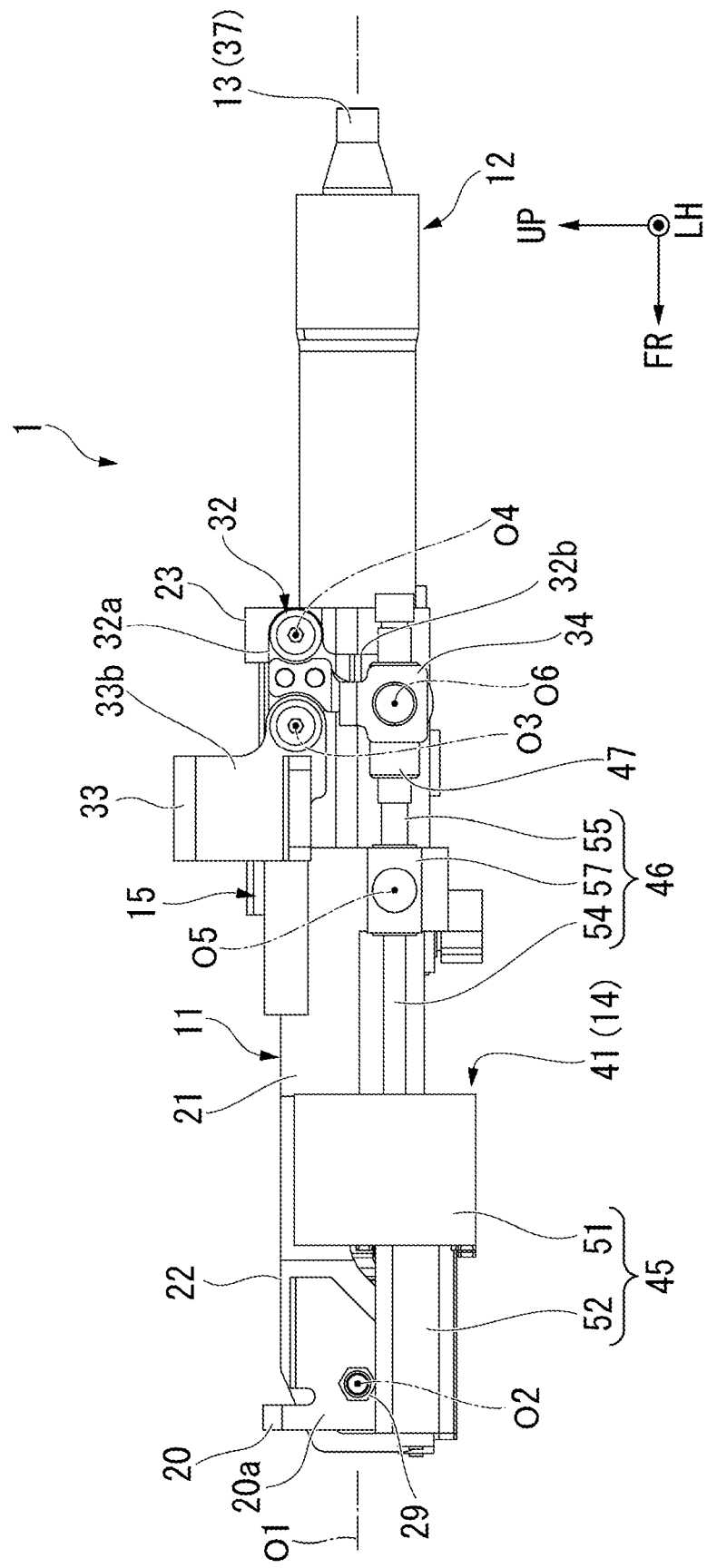
FIG. 3 is a left side view of the steering device.

FIG. 3 is a left side view of the steering device 1.

As shown in FIG. 3, the above-described second link plate 32 connects the rear side mounting stay 23 and the rear side bracket 33 to each other on the left side with respect to the housing 11. The second link plate 32 is formed in a T-shape in a side view. Specifically, the second link plate 32 has a forward-rearward extending portion 32*a* and a downward extending portion 32*b* extending downward from the forward-rearward extending portion 32*a*. The front end portion of the forward-rearward extending portion 32*a* is supported by the above-described left side wall 33*b* so as to be pivotable around the axis line O3. The rear end portion of the forward-rearward extending portion 32*a* is supported by the rear side mounting stay 23 so as to be pivotable around the above-described axis line O4.

The support plate 34 is attached to the second link plate 32. The support plate 34 is formed in a crank shape extending in the upward-downward direction. The upper end portion of the support plate 34 is fixed to the forward-rearward extending portion 32*a*. The lower end portion of the support plate 34 faces the downward extending portion 32*b* at an interval in the rightward-leftward direction.

Pipe

As shown in FIG. 1, the pipe 12 is formed in a cylindrical shape extending in the shaft axis direction. An outer diameter of the pipe 12 is smaller than an inner diameter of the holding cylinder 21. The pipe 12 is inserted into the holding cylinder 21. The pipe 12 is configured to be movable in the shaft axis direction with respect to the holding cylinder 21 (housing 11). An outer ring of the rear side bearing 35 is fitted (press-fitted) to the rear end portion of the pipe 12.

Steering Shaft

As shown in FIG. 2, the steering shaft 13 includes an inner shaft 37 and an outer shaft 38.

The inner shaft 37 is formed in a cylindrical shape extending in the shaft axis direction. The inner shaft 37 is inserted into the pipe 12. The rear end portion of the inner shaft 37 is press-fitted to the inner ring of the above-described rear side bearing 35.

In this manner, the inner shaft 37 is supported inside the pipe 12 via the rear side bearing 35 so as to be rotatable around the axis line O1. The steering wheel 2 is joined to a portion protruding rearward from the pipe 12 in the inner shaft 37.

The outer shaft 38 is formed in a cylindrical shape extending in the shaft axis direction. The outer shaft 38 is inserted into the pipe 12 inside the holding cylinder 21. In the rear end portion of the outer shaft 38, the inner shaft 37 is inserted into the pipe 12. The front end portion of the outer shaft 38 is press-fitted to the inner ring of the front side bearing 25 inside the holding cylinder 21. In this manner, the outer shaft 38 is supported so as to be rotatable around the axis line O1 inside the holding cylinder 21.

The inner shaft 37 and the pipe 12 are configured to be movable in the shaft axis direction with respect to the outer shaft 38. The outer peripheral surface of the inner shaft 37 has a male spline, for example. The male spline engages with a female spline formed on the inner peripheral surface of the outer shaft 38. In this manner, the inner shaft 37 moves in the shaft axis direction with respect to the outer shaft 38 while relative rotation with respect to the outer shaft 38 is regulated. However, a telescopic structure or a rotation regulation structure of the steering shaft 13 can be appropriately changed. In the present embodiment, a configuration has been described in which the outer shaft 38 is located forward of the inner shaft 37. However, without being limited to this configuration, the present invention may adopt a configuration in which the outer shaft 38 is located rearward of the inner shaft 37.

Drive Mechanism

As shown in FIG. 1, the drive mechanism 14 includes a tilt mechanism 41 and a telescopic mechanism (actuator) 42. For example, the tilt mechanism 41 is located on the left side of the housing 11. For example, the telescopic mechanism 42 is located on the right side of the housing 11. The drive mechanism 14 may have at least the telescopic mechanism 42.

As shown in FIG. 3, the tilt mechanism 41 includes a tilt motor unit 45, a tilt joint portion 46, and a tilt movable portion 47. The tilt mechanism 41 switches between regulation and allowance of the steering device 1 pivoting around the axis line O2 by driving the tilt motor unit 45.

The tilt motor unit 45 includes a tilt gear box 51 and a tilt motor 52.

Figure 4:
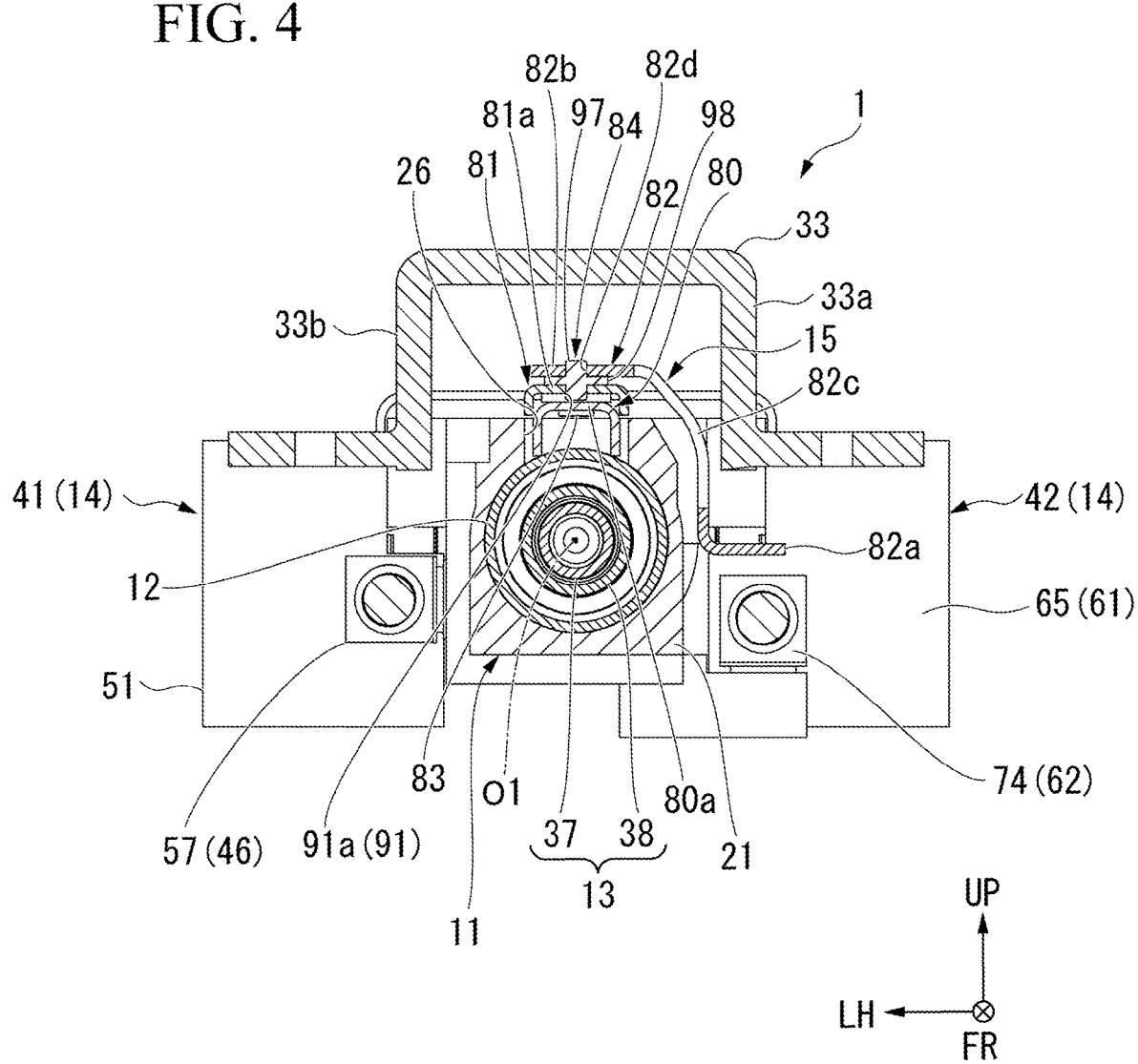
FIG. 4 is a sectional view taken along line IV-IV in FIG. 1.

The tilt gear box 51 protrudes leftward in the front end portion (boundary portion between the holding cylinder 21 and the front side mounting stay 22) of the housing 11 (refer to FIG. 4). The tilt gear box 51 houses a speed reduction mechanism (not shown).

The tilt motor 52 is attached to the front end portion of the tilt gear box 51. In the present embodiment, the tilt motor 52 is attached to the tilt gear box 51 in a state where the axial direction of the output shaft (not shown) is directed in the shaft axis direction. The output shaft of the tilt motor 52 is connected to the speed reduction mechanism inside the tilt gear box 51.

The tilt joint portion 46 includes a tilt wire 54, a tilt shaft 55, and a tilt coupling 57.

The tilt coupling 57 joins the tilt wire 54 and the tilt shaft 55 to each other. The tilt coupling 57 is supported so as to be rotatable around an axis line O5 extending in the rightward-leftward direction in the central portion in the shaft axis direction of the holding cylinder 21.

The tilt wire 54 is laid across the tilt gear box 51 and the tilt coupling 57. The tilt wire 54 is configured to be rotatable in accordance with the driving of the tilt motor 52. The tilt wire 54 is configured to be flexibly deformable. The connection member connecting the tilt gear box 51 and the tilt coupling 57 to each other is not limited to those which are flexibly deformable unlike the tilt wire 54. That is, depending on the layout of the tilt gear box 51 and the tilt coupling 57, the tilt gear box 51 and the tilt coupling 57 may be connected to each other by the connection member which does not flexibly deform.

The tilt shaft 55 is laid across the tilt coupling 57 and the tilt movable portion 47. The tilt shaft 55 is rotated together with the tilt wire 54 in accordance with the driving of the tilt motor 52. A male screw is formed on the outer peripheral surface of the tilt shaft 55.

The tilt movable portion 47 is supported so as to be pivotable around an axis line O6 extending in the rightward-leftward direction between the downward extending portion 32b of the above-described second link plate 32 and the lower end portion of the support plate 34. The tilt movable portion 47 is formed in a cylindrical shape in which the extending direction of the tilt shaft 55 is set as the axial direction. For example, a female screw is formed on the inner peripheral surface of the tilt movable portion 47. The tilt shaft 55 is screwed into the tilt movable portion 47. That is, the tilt movable portion 47 is configured to be movable in the extending direction of the tilt shaft 55 in accordance with the rotation of the tilt shaft 55.

As shown in FIG. 1, the telescopic mechanism 42 includes a telescopic motor unit (motor unit) 61, a telescopic joint portion (joint portion) 62, and a telescopic movable portion (nut) 63. The telescopic mechanism 42 switches between regulation and allowance of the forward and rearward movement of the pipe 12 (steering shaft 13) with respect to the housing 11 by driving the telescopic motor unit 61.

The telescopic motor unit 61 includes a telescopic gear box 65 and a telescopic motor 66.

The telescopic gear box 65 is disposed to protrude rightward in the front end portion of the housing 11. The telescopic gear box 65 houses a speed reduction mechanism (not shown).

The telescopic motor 66 is attached to the front end portion of the telescopic gear box 65. The telescopic motor 66 is attached to the telescopic gear box 65 in a state where the axial direction of the output shaft (not shown) is directed in the shaft axis direction. The output shaft of the telescopic motor 66 is connected to the speed reduction mechanism inside the telescopic gear box 65.

The telescopic joint portion 62 includes a telescopic wire 71, a telescopic shaft (shaft) 72, and a telescopic coupling 74.

The telescopic coupling 74 joins the telescopic wire 71 and the telescopic shaft 72 to each other. The telescopic coupling 74 is supported by a substantially central portion in the shaft axis direction of the holding cylinder 21.

The telescopic wire 71 is laid across the telescopic gear box 65 and the telescopic coupling 74. The telescopic wire 71 is configured to be rotatable in accordance with the driving of the telescopic motor 66. The telescopic wire 71 is configured to be flexibly deformable. The connection member connecting the telescopic gear box 65 and the telescopic coupling 74 to each other may not be flexibly deformable unlike the telescopic wire 71. That is, depending on the layout of the telescopic gear box 65 and the telescopic coupling 74, the telescopic gear box 65 and the telescopic coupling 74 may be connected to each other by the connection member which does not flexibly deform.

The telescopic shaft 72 is laid across the telescopic coupling 74 and the telescopic movable portion 63. The telescopic shaft 72 is rotated together with the telescopic wire 71 in accordance with the driving of the telescopic motor 66. A male screw is formed on the outer peripheral surface of the telescopic shaft 72.

The telescopic movable portion 63 is formed in a block shape. The telescopic movable portion 63 has a through-hole 63a penetrating the telescopic movable portion 63 in the shaft axis direction. For example, a female screw is formed on the inner surface of the through-hole 63a. The telescopic shaft 72 is screwed into the through-hole 63a of the telescopic movable portion 63. That is, the telescopic movable portion 63 is configured to be movable in the extending direction of the telescopic shaft 72 in accordance with the rotation of the telescopic shaft 72.

Load Absorbing Mechanism

Figure 5:
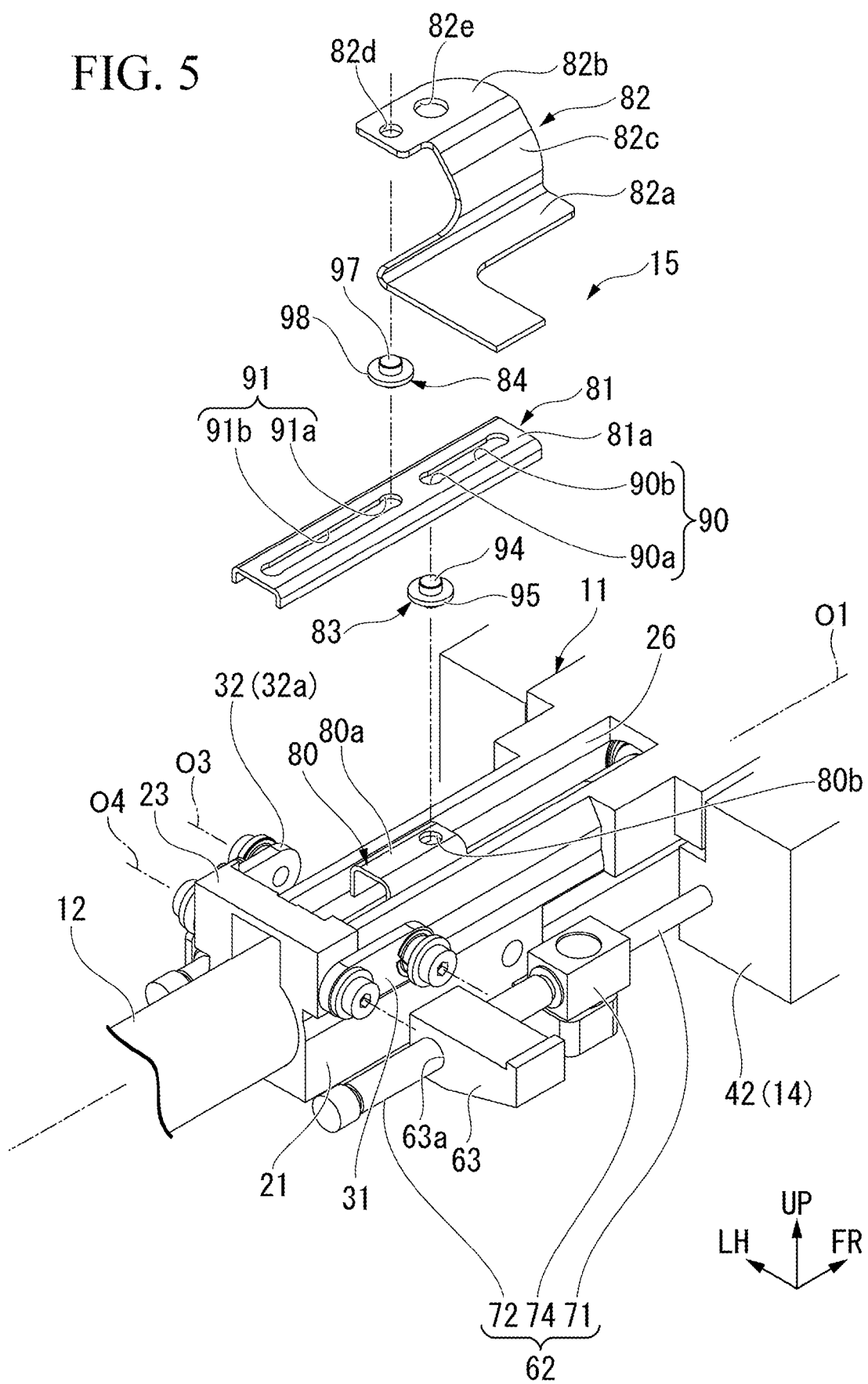
FIG. 5 is an exploded perspective view of a load absorbing mechanism.

FIG. 4 is a sectional view taken along line IV-IV in FIG. 1. FIG. 5 is an exploded perspective view of the load absorbing mechanism 15.

As shown in FIGS. 4 and 5, the load absorbing mechanism 15 includes a hanger bracket (first support portion) 80, an energy absorbing (EA) plate (intermediate support portion) 81, a guide plate (second support portion) 82, a first connection member 83, and a second connection member 84.

The hanger bracket 80 is fixed to the upper portion of the pipe 12 in the front end portion of the pipe 12. The hanger bracket 80 extends in the shaft axis direction. The hanger bracket 80 is formed in a C-shape which is open downward. The hanger bracket 80 is housed inside the slit 26 of the housing 11.

In the top wall portion 80a of the hanger bracket 80, the front-end portion has a through-hole 80b penetrating the top wall portion 80a in the upward-downward direction. In the present embodiment, the through-hole 80b is a female screw hole.

The guide plate 82 connects the above-described telescopic movable portion 63 and the EA plate 81 to each other. The guide plate 82 is formed in a crank shape in a front view. Specifically, the guide plate 82 has a lower wall portion 82a, an upper wall portion 82b, and a connection wall portion 82c connecting the lower wall portion 82a and the upper wall portion 82b to each other.

The lower wall portion 82a is fixed to the upper surface of the telescopic movable portion 63. The connection wall portion 82c extends upward from the left side end portion of the lower wall portion 82a. The upper wall portion 82b extends leftward from the upper end portion of the connection wall portion 82c. The upper wall portion 82b overlaps the EA plate 81 from above the housing 11.

The rear end portion of the upper wall portion 82b has a through-hole 82d penetrating the upper wall portion 82b in the upward-downward direction. In the present embodiment, the through-hole 82d is a female screw hole.

The front end portion of the upper wall portion 82b has a confirmation hole 82e penetrating the upper wall portion 82b in the upward-downward direction. The confirmation hole 82e is formed to be larger in diameter than the through-hole 82d. The guide plate 82 may be configured to have no confirmation hole 82e.

The EA plate 81 extends in the shaft axis direction between the hanger bracket 80 and the guide plate 82 in the upward-downward direction. The EA plate 81 is formed in a C-shape which is open downward in a front view. The length of the EA plate 81 in the forward-rearward direction is longer than the hanger bracket 80 and the guide plate 82. It is preferable that the EA plate 81 is located above the slit 26 (holding cylinder 21).

The top wall portion 81a of the EA plate 81 has a first long hole 90 and a second long hole 91. The respective long holes 90 penetrate the top wall portion 81a in the upward-downward direction.

The first long hole 90 extends in the shaft axis direction in the front portion of the EA plate 81. Specifically, the first long hole 90 has a first large diameter portion 90a located in the rear end portion and a first small diameter portion 90b extending forward from the first large diameter portion 90a.

The second long hole 91 extends in the shaft axis direction in the rear portion of the EA plate 81. The second long hole 91 is linearly aligned with the first long hole 90 in a state where the second long hole 91 has an interval from the first long hole 90 in the shaft axis direction. Specifically, the second long hole 91 has a second large diameter portion 91a located in the front end portion and a second small diameter portion 91b extending rearward from the second large diameter portion 91a.

In a plan view, the EA plate 81 is located between the hanger bracket 80 and the guide plate 82, in a state where the first large diameter portion 90a and the through-hole 80b of the hanger bracket 80 overlap each other and the second large diameter portion 91a and the through-hole 82d of the guide plate 82 overlap each other.

The first connection member 83 connects the hanger bracket 80 and the EA plate 81 to each other. Specifically, the first connection member 83 includes a first connection pin 94 and a first interposed member 95.

For example, the lower end portion of the first connection pin 94 is screwed into the through-hole 80b of the hanger bracket 80. The upper end portion of the first connection pin 94 is fitted into the first large diameter portion 90a of the EA plate 81. That is, the outer diameter of the first connection pin 94 is equal to or smaller than the width (width in the rightward-leftward direction) of the first large diameter portion 90a, and is larger than the width of the first small diameter portion 90b. The first connection pin 94 is visible from above the guide plate 82 through the above-described confirmation hole 82e. As long as the first connection pin 94 is configured to connect the hanger bracket 80 and the EA plate 81 to each other through the first large diameter portion 90a and the through-hole 80b, a method of connecting the hanger bracket 80 and the EA plate 81 to each other can be appropriately changed.

The first interposed member 95 is a nut, for example. The first interposed member 95 is screwed to a portion located between the top wall portion 80a of the hanger bracket 80 and the top wall portion 81a of the EA plate 81 in the first connection pin 94. The first interposed member 95 is interposed between the top wall portions 80a and 81a so as to hold a gap between the top wall portions 80a and 81a. The first interposed member 95 may not be screwed to the first connection pin 94 as long as the first interposed member 95 is configured to be interposed between the top wall portions 80a and 81a. In this case, the first interposed member 95 may be formed in a disc spring shape, for example. The first interposed member 95 can be formed of a resin material or a metal material.

The second connection member 84 connects the EA plate 81 and the guide plate 82 to each other. Specifically, the second connection member 84 includes a second connection pin 97 and a second interposed member 98.

The lower end portion of the second connection pin 97 is fitted into the second large diameter portion 91a of the EA plate 81. For example, the upper end portion of the second connection pin 97 is screwed into the through-hole 82d of the guide plate 82. That is, the outer diameter of the second connection pin 97 is equal to or smaller than the width of the second large diameter portion 91a, and is larger than the width of the second small diameter portion 91b. As long as the second connection pin 97 is configured to connect the EA plate 81 and the guide plate 82 to each other through the second large diameter portion 91a and the through-hole 80b, a method of connecting the EA plate 81 and the guide plate 82 to each other can be appropriately changed.

The second interposed member 98 is a nut, for example. The second interposed member 98 is screwed to a portion located between the top wall portion 81a of the EA plate 81 and the upper wall portion 82b of the guide plate 82 in the second connection pin 97. The second interposed member 98 is interposed between the top wall portions 81a and the upper wall portion 82b so as to hold a gap between the top wall portions 81a and the upper wall portion 82b. The second interposed member 98 may not be screwed to the second connection pin 97 as long as the second interposed member 98 is configured to be interposed between the top wall portion 80a and the upper wall portion 82b.

Operation

Next, an operation of the above-described steering device 1 will be described. In the following description, a tilt operation, a telescopic operation, and an operation at the time of secondary collision will be mainly described.

Tilt Operation

As shown in FIG. 3, during the tilt operation, a driving force of the tilt motor 52 is transmitted to the housing 11 via the second link plate 32, thereby causing the housing 11 to pivot around the axis line O2. Specifically, in a case where the steering wheel 2 is adjusted to face upward, the tilt motor 52 is driven so as to rotate the tilt wire 54 and the tilt shaft 55 in a first direction, for example. If the tilt shaft 55 is rotated in the first direction, the tilt movable portion 47 moves rearward with respect to the tilt shaft 55. As the tilt movable portion 47 moves rearward, the forward-rearward extending portion 32a of the second link plate 32 and the first link plate 31 pivot upward around the axis line O3. As a result, the steering wheel 2 pivots upward around the axis line O2 together with the housing 11, the pipe 12, and the steering shaft 13.

In a case where the steering wheel 2 is adjusted to face downward, the tilt shaft 55 is rotated in a second direction. Then, the tilt movable portion 47 moves forward with respect to the tilt shaft 55. As the tilt movable portion 47 moves forward, the forward-rearward extending portion 32a of the second link plate 32 and the first link plate 31 pivot downward around the axis line O3. As a result, the steering wheel 2 pivots downward along the axis line O2 together with the housing 11, the pipe 12, and the steering shaft 13.

Telescopic Operation

As shown in FIG. 1, during the telescopic operation, a driving force of the telescopic motor 66 is transmitted to the pipe 12 via the guide plate 82, the EA plate 81, and the hanger bracket 80, thereby causing the pipe 12 and the inner shaft 37 to move forward to and rearward from the housing 11 and the outer shaft 38. Specifically, in a case where the steering wheel 2 is moved rearward, the telescopic wire 71 and the telescopic shaft 72 are rotated in a first direction, for example, by driving the telescopic motor 66. If the telescopic shaft 72 is rotated in the first direction, the telescopic movable portion 63 and the guide plate 82 move rearward from the telescopic shaft 72. In accordance with the rearward movement of the guide plate 82, the pipe 12 moves rearward. In this manner, the steering wheel 2 moves rearward.

In a case where the steering wheel 2 is moved forward, the telescopic wire 71 and the telescopic shaft 72 are rotated in a second direction, for example. If the telescopic shaft 72 is rotated in the second direction, the telescopic movable portion 63 and the guide plate 82 move forward to the telescopic shaft 72. In accordance with the forward movement of the guide plate 82, the pipe 12 moves forward. In this manner, the steering wheel 2 moves forward.

During Secondary Collision

Next, an operation at the time of secondary collision will be described.

Figure 6:
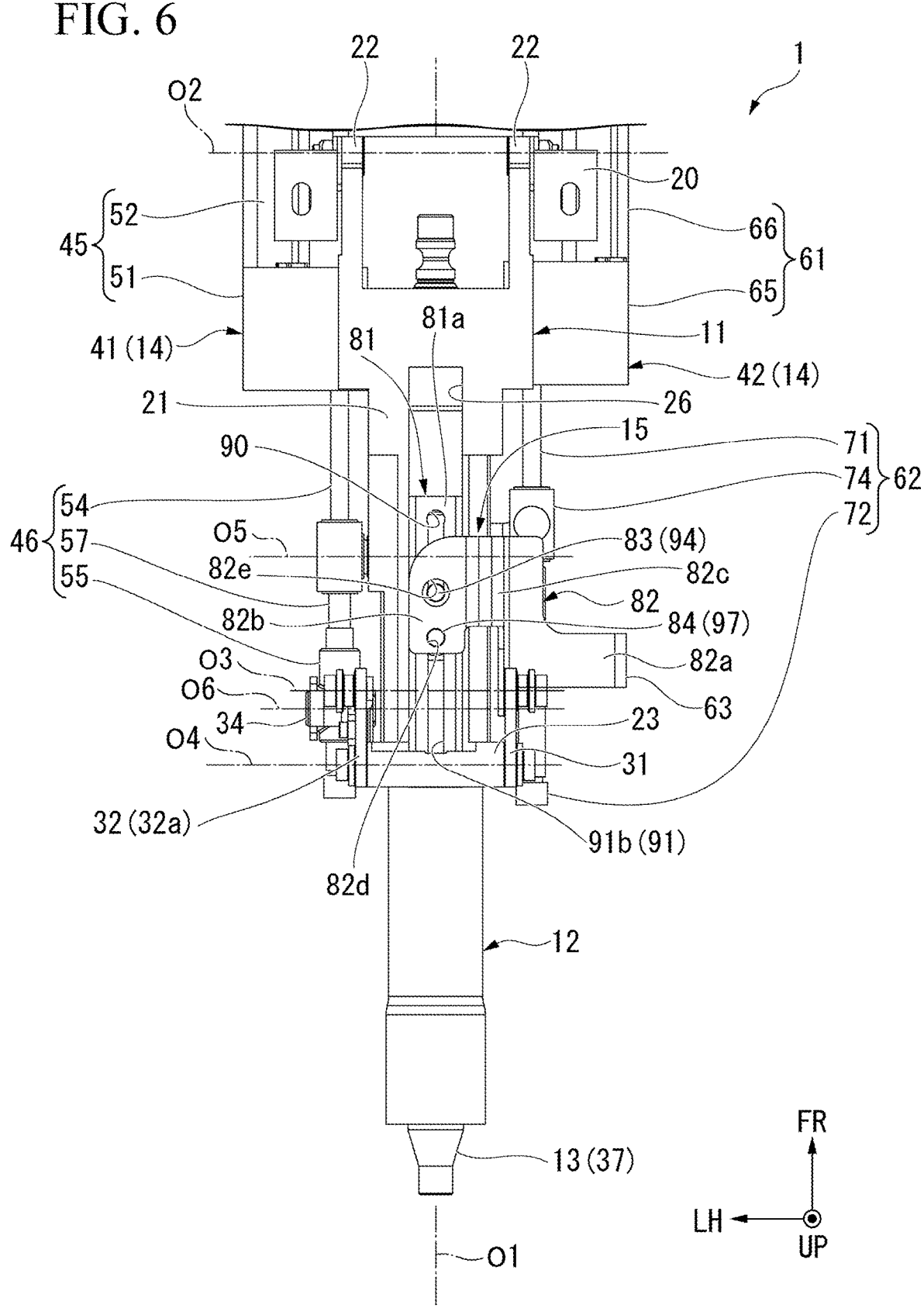
FIG. 6 is a plan view of the steering device in a state where a rear side bracket is detached therefrom.

As shown in FIG. 6, at the time of secondary collision (in a case where the collision load has a predetermined value or greater), the steering wheel 2 together with the pipe 12, the hanger bracket 80, and the inner shaft 37 moves forward to the housing 11 and the outer shaft 38.

Figure 7:
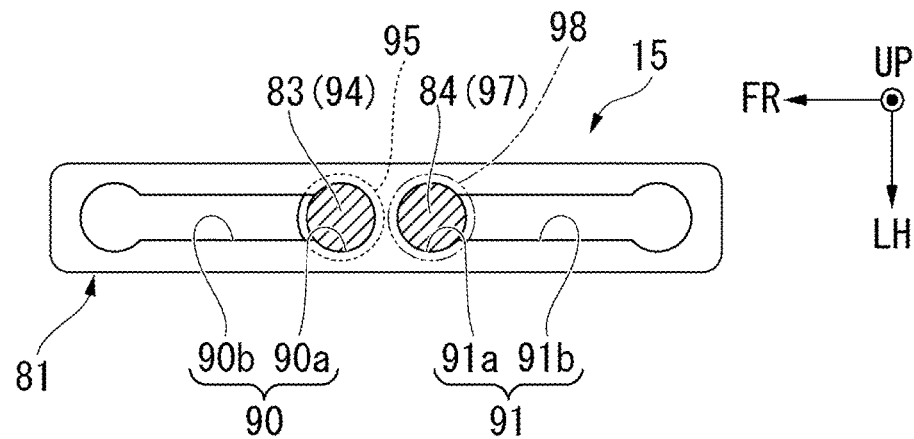
FIG. 7 is a view showing an operation performed at the time of secondary collision.
Figure 8:
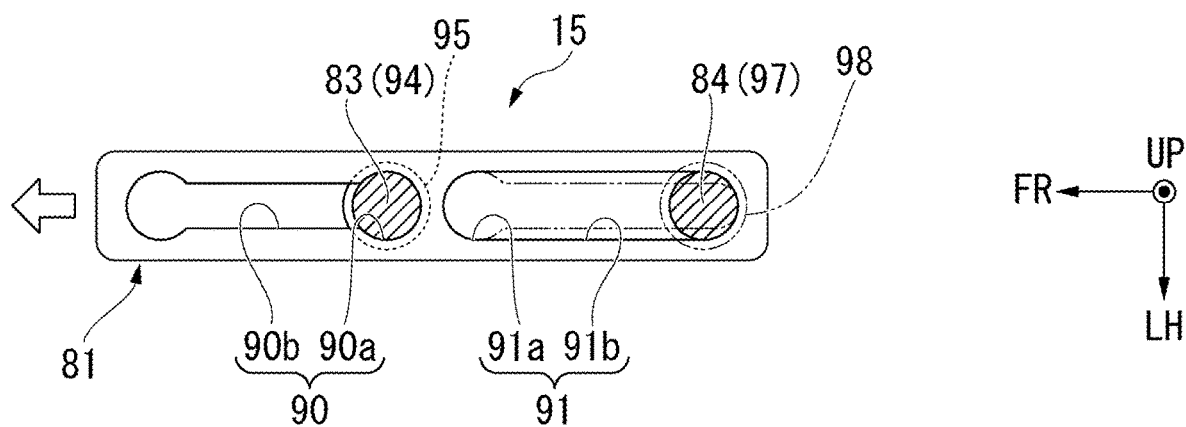
FIG. 8 is a view showing an operation performed at the time of secondary collision.
Figure 9:
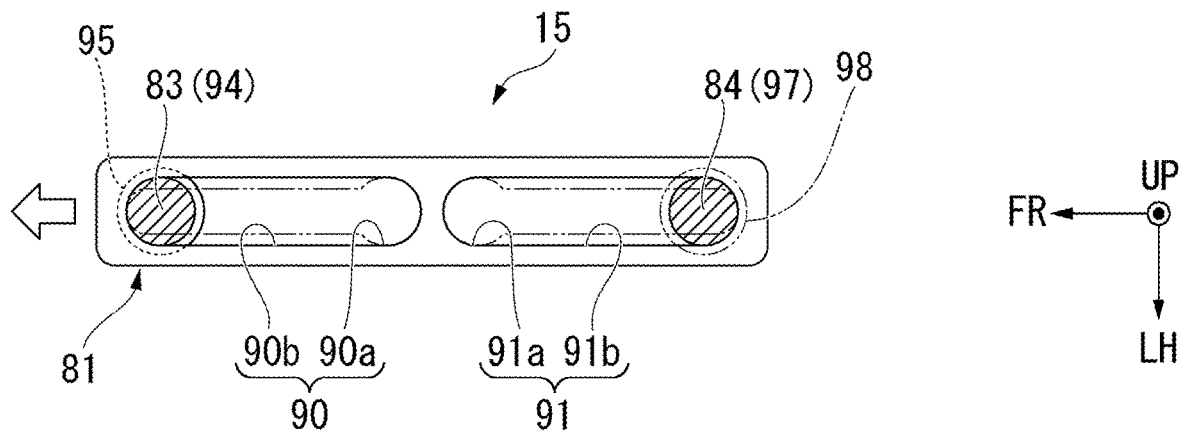
FIG. 9 is a view showing an operation performed at the time of secondary collision.

FIGS. 7 to 9 are views showing the operation performed at the time of secondary collision.

FIGS. 6 and 7 show the EA plate 81, the first connection member 83, and the second connection member 84 during a normal use. In FIG. 7, at the time of secondary collision, the pipe 12, the hanger bracket 80, the EA plate 81, and the first connection member 83 first move forward to the guide plate 82 and the second connection member 84. In this case, the outer diameter of the second connection pin 97 is larger than the width of the second small diameter portion 91b. Therefore, the EA plate 81 moves forward while the second small diameter portion 91b is pressed and widened by the second connection pin 97 (first stage stroke). Then, an impact load applied to a driver at the time of secondary collision is relieved by a load generated when the second small diameter portion 91b is pressed and widened.

As shown in FIGS. 6 and 8, the second connection pin 97 butts against the rear end edge of the second small diameter portion 91b, thereby regulating the forward movement of the EA plate 81 with respect to the guide plate 82 and the second connection member 84. Thereafter, if the collision load is further applied thereto, the pipe 12, the hanger bracket 80, and the first connection member 83 move forward to the EA plate 81 and the guide plate 82. In this case, the outer diameter of the first connection pin 94 is larger than the width of the first small diameter portion 90b. Therefore, as shown in FIG. 9, the first connection member 83 moves forward while the first small diameter portion 90b is pressed and widened by the first connection pin 94 (second stage stroke). Then, the impact load applied to the driver at the time of secondary collision is relieved by the load generated when the first small diameter portion 90b is pressed and widened.

At the time of secondary collision, in addition to the load applied when the small diameter portions 90b and 91b are pressed and widened by the connection pins 94 and 97, the impact load may be relieved by the following methods, for example.

(1) Sliding resistance between the outer peripheral surface of the pipe 12 and the inner peripheral surface of the holding cylinder 21

(2) Sliding resistance between the first interposed member 95 and the EA plate 81 or sliding resistance between the second interposed member 98 and the EA plate 81

The sliding portions of the above-described (1) and (2) may be coated with a coating material having a high coefficient of friction, or may be processed to have irregularities.

As described above, according to the present embodiment, the EA plate 81 moves forward to the guide plate 82 and the second connection member 84 in the first stage stroke. The first connection member 83 and the hanger bracket 80 move forward to the guide plate 82 and the EA plate 81 in the second stage stroke. That is, in the steering device 1 according to the present embodiment, the load applied between the second connection member 84 and the EA plate 81 in the first stage stroke is lower than the load applied between the first connection member 83 and the hanger bracket 80 in the second stage stroke.

According to the present embodiment, dimensions of the load absorbing mechanism 15 are set so as to satisfy the above-described conditions. For example, the loads in the first stage stroke and the second stage stroke can be adjusted by changing a plate thickness of the EA plate 81 (top wall portion 81a), an interference between the first connection pin 94 and the first small diameter portion 90b, or an interference between the second connection pin 97 and the second small diameter portion 91b.

In this way, the present embodiment adopts the following configuration. In the load absorbing mechanism 15, at the time of secondary collision, the EA plate 81 moves forward to the second connection pin 97, and the first connection pin 94 moves forward to the EA plate 81.

According to this configuration, at the time of secondary collision, the collision load can be relieved by the load applied between the second connection pin 97 and the EA plate 81 and the load applied between the EA plate 81 and the first connection pin 94. That is, the EA plate 81 relatively slides on both the first connection member 83 and the second connection member 84. Therefore, compared to a configuration in which the impact load is relieved only by the sliding between the EA plate 81 and the pipe 12, the length of the EA plate 81 in the shaft axis direction can be shortened as much as the length of the second long hole 91. In this manner, front and rear spaces for the EA plate 81 are likely to be secured while securing the stroke at the time of secondary collision. Therefore, layout quality around the pipe 12 can be improved.

Moreover, the present embodiment adopts a configuration in which the hanger bracket 80 is separately disposed in the pipe 12.

According to this configuration, compared to a case where a support portion for supporting the first connection member 83 is integrally formed with the pipe 12, it is possible to prevent degraded rigidity or complicated work of the pipe 12 which is caused by forming the support portion.

The present embodiment adopts the following configuration. The first connection member 83 is connected to the EA plate 81 through the first long hole 90, and the second connection member 84 is connected to the EA plate 81 through the second long hole 91.

According to this configuration, the EA plate 81 and the hanger bracket 80 can be reliably connected to each other, and the EA plate 81 and the guide plate 82 can be reliably connected to each other by the connection members 83 and 84. In this manner, when in normal use (for example, during the telescopic operation), the pipe 12 and the telescopic movable portion 63 can be reliably connected to each other via the load absorbing mechanism 15. At the time of secondary collision, the EA plate 81 can be stably slid on the connection members 83 and 84.

The present embodiment adopts a configuration in which the first small diameter portion 90b is widened by the first connection member 83 and the second small diameter portion 91b is widened by the second connection member 84 widens at the time of secondary collision.

According to this configuration, 84 at the time of secondary collision, it is possible to secure the load applied between the EA plate 81 and the first connection member 83 and the load applied between the EA plate 81 and the second connection member. In this manner, the collision absorbing performance can be improved.

Moreover, compared to a case where the impact load is relieved by the first stage stroke as in the related art, it is possible to prevent the movement of the connection member from being hindered by burrs generated when the slit is widened. Therefore, it is possible to prevent an excessive increase in the load applied between the first connection member 83 and the EA plate 81 and the load applied between the second connection member 84 and the EA plate 81.

The present embodiment adopts a configuration in which the telescopic shaft 72 is screwed to the telescopic movable portion 63 in the telescopic mechanism 42.

According to this configuration, at the time of secondary collision, the male screw of the telescopic shaft 72 and the female screw of the telescopic movable portion 63 come into contact with each other. Accordingly, the forward movement of the telescopic movable portion 63 with respect to the housing 11 is regulated. In this manner, it is possible to prevent the guide plate 82 together with the pipe 12 from moving forward during the first stage stroke. In this case, it is not necessary to separately provide a fixing portion of the guide plate 82. Therefore, it is possible to prevent an increase in the number of components and a complicated configuration.

Hitherto, the preferred embodiments according to the present invention have been described. However, the present invention is not limited to the embodiments. Additions, omissions, substitutions, and other modifications of the configurations are possible within the scope not departing from the gist of the present invention. The invention is not limited by the above-described configurations, and is limited only by the appended claims.

For example, in the above-described embodiment, a configuration has been described in which the axis line O1 intersects the forward-rearward direction. However, the invention is not limited to this configuration. The axis line O1 may coincide with the forward-rearward direction of the vehicle.

In the above-described embodiment, a configuration has been described in which the long holes 90 and 91 are respectively formed in the EA plate 81. However, the invention is not limited to this configuration. For example, a configuration may be adopted as follows. A thin-wall portion in which the connection members 83 and 84 can be broken may be formed in the EA plate 81. Alternatively, the connection members 83 and 84 may simply slide on the EA plate 81. The widths of the respective long holes 90 and 91 in the rightward-leftward direction may be uniform over the entire length in the shaft axis direction. That is, in the steering device according to the present invention, a configuration may be adopted so that the sliding resistance is generated between the EA plate 81 and the connection members 83 and 84.

In the above-described embodiment, a configuration has been described in which the hanger bracket 80 and the EA plate 81 are connected to each other by the first connection pin 94 and the EA plate 81 and the guide plate 82 are connected to each other by the second connection pin 97. However, the invention is not limited to this configuration. For example, the connection member may be slidable on the EA plate 81 by being interposed between the hanger bracket 80 and the EA plate 81 and between the EA plate 81 and the guide plate 82.

In the above-described embodiment, a case has been described where the telescopic mechanism 42 is a feed screw mechanism. However, the invention is not limited to this configuration. For example, the telescopic mechanism 42 may employ a gear.

In the above-described embodiment, a configuration has been described in which a motor unit (stationary portion) is disposed in the housing 11. However, the invention is not limited to this configuration. A motor unit (movable portion) may be disposed in the pipe 12.

In the above-described embodiment, a configuration has been described in which the EA plate 81 moves forward to the second connection member 84 in the first stage stroke, and the first connection member 83 moves forward to the EA plate 81 in the second stage stroke. However, the invention is not limited to this configuration. The first connection member 83 may move forward to the EA plate 81 in the first stage stroke, and the EA plate 81 may move forward to the second connection member 84 in the second stage stroke.

In the above-described embodiment, the electrically operated steering device 1 which performs the telescopic operation or the tilt operation by using an actuator (drive mechanism 14) has been described. However, without being limited this configuration, a steering device which can manually perform the telescopic operation or the tilt operation may be used.

In the above-described embodiment, a configuration has been described in which the first connection member 83 is connected to the pipe 12 via the hanger bracket 80. However, without being limited to this configuration, the first connection member 83 may be directly connected to the pipe 12.

While preferred embodiments of the invention have been described and shown above, it should be understood that these are exemplary examples of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A steering device comprising:
a pipe into which a steering shaft is inserted so as to be rotatable around a first axis line extending along a forward-rearward direction;
a housing that is supported by a vehicle body, and that supports the pipe so as to be movable in the forward-rearward direction;
a telescopic mechanism that moves the pipe with respect to the housing in the forward-rearward direction; and
a load absorbing mechanism that is disposed between the pipe and the telescopic mechanism,
wherein the load absorbing mechanism includes
a first support portion disposed in the pipe, a second support portion disposed in the telescopic mechanism, an intermediate support portion located between the first support portion and the second support portion, a first connection member fixed to the first support portion, and connecting the first support portion and the intermediate support portion to each other, and a second connection member fixed to the second support portion, and connecting the second support portion and the intermediate support portion to each other, and wherein in a case where a forward acting load applied to the pipe has a predetermined value or greater, the load absorbing mechanism is configured so that the first connection member and the intermediate support portion are relatively slidable, and is configured so that the second connection member and the intermediate support portion are relatively slidable.

2. The steering device according to claim 1, wherein the intermediate support portion overlaps a portion between the first support portion and the second support portion, when viewed in an intersection direction intersecting the forward-rearward direction, wherein the intermediate support portion has a first long hole penetrating the intermediate support portion in the intersection direction, and extending in the forward-rearward direction, and a second long hole penetrating the intermediate support portion in the intersection direction, and extending in the forward-rearward direction, wherein the first connection member is inserted into a rear end portion of the first long hole, and wherein the second connection member is inserted into a front end portion of the second long hole.

3. The steering device according to claim 2, wherein the first long hole has a first large diameter portion which is located in a rear end portion of the first long hole, and into which the first connection member is inserted, and a first small diameter portion which extends forward of the first large diameter portion, and which is widened by the first connection member when the first connection member and the intermediate support portion relatively move in the forward-rearward direction, and wherein the second long hole has a second large diameter portion which is located in a front end portion of the second long hole, and into which the second connection member is inserted, and a second small diameter portion which extends rearward of the second large diameter portion, and which is widened by the second connection member when the second connection member and the intermediate support portion relatively move in the forward-rearward direction.

4. The steering device according to claim 1, wherein the telescopic mechanism includes a motor unit disposed in the housing, a shaft having a male screw joined to an output shaft of the motor unit, and a nut disposed in the pipe, and screwed to the shaft.

\* \* \* \* \*